United States Patent
Kothari

(10) Patent No.: US 11,669,613 B2
(45) Date of Patent: Jun. 6, 2023

(54) METHOD FOR ANALYZING AND VERIFYING SOFTWARE FOR SAFETY AND SECURITY

(71) Applicant: EnSoft Corp., Ames, IA (US)

(72) Inventor: Suraj C. Kothari, Ames, IA (US)

(*) Notice: Subject to any disclaimer, the term of this patent is extended or adjusted under 35 U.S.C. 154(b) by 22 days.

(21) Appl. No.: 17/328,495

(22) Filed: May 24, 2021

(65) Prior Publication Data

US 2021/0374236 A1 Dec. 2, 2021

Related U.S. Application Data

(60) Provisional application No. 63/031,952, filed on May 29, 2020.

(51) Int. Cl.
| | |
|---|---|
| *G06F 21/00* | (2013.01) |
| *G06F 21/54* | (2013.01) |
| *G06F 7/52* | (2006.01) |
| *G06F 21/57* | (2013.01) |
| *G06F 21/55* | (2013.01) |

(52) U.S. Cl.
CPC .............. *G06F 21/54* (2013.01); *G06F 7/52* (2013.01); *G06F 21/554* (2013.01); *G06F 21/577* (2013.01)

(58) Field of Classification Search
CPC ........ G06F 21/577; G06F 21/554; G06F 7/52; G06F 21/54
USPC ......................................................... 726/22
See application file for complete search history.

(56) References Cited

U.S. PATENT DOCUMENTS

| | | | |
|---|---|---|---|
| 4,949,243 A | | 8/1990 | Ali et al. |
| 5,163,016 A | * | 11/1992 | Har'El ................. G06F 30/30 |
| | | | 716/102 |
| 5,175,856 A | | 12/1992 | Dyke et al. |
| 5,297,150 A | | 3/1994 | Clark |
| 5,317,511 A | | 5/1994 | Jacobson |
| 5,347,639 A | | 9/1994 | Rechtschaffen et al. |
| 5,355,492 A | | 10/1994 | Frankel et al. |
| 5,371,747 A | | 12/1994 | Brooks et al. |
| 5,412,784 A | | 5/1995 | Rechtschaffen et al. |

(Continued)

FOREIGN PATENT DOCUMENTS

| | | | |
|---|---|---|---|
| WO | | 9310500 A1 | 5/1993 |
| WO | | WO-9310500 A1 * | 5/1993 ............... G06K 9/66 |

OTHER PUBLICATIONS

Abramson, D., et al., "Relative Debugging and its Application to the Development of Large Numerical Models", Association for Computing Machinery, Inc. (ACM), Copyright by ACM, pp. 1-12, (1995).

(Continued)

*Primary Examiner* — Josnel Jeudy
(74) *Attorney, Agent, or Firm* — Vander Velden Law Firm, LLC; Melinda S. Vander Velden

(57) ABSTRACT

A computer implemented method for analyzing and verifying software for safety and security. A software program comprising a sequence of program statements to be executed is provided. A compact representation of the program is computed, and the subset of program statements that are relevant to a property of the software to be verified is identified. A homomorphism that maps non-relevant program statements to an identity is computed, and the property is verified using the homomorphism.

20 Claims, 10 Drawing Sheets

(56) References Cited

U.S. PATENT DOCUMENTS

| | | | |
|---|---|---|---|
| 5,485,616 | A | 1/1996 | Burke et al. |
| 5,740,421 | A | 4/1998 | Palmon |
| 5,768,564 | A | 6/1998 | Andrews et al. |
| 5,819,094 | A | 10/1998 | Sato et al. |
| 5,857,180 | A | 1/1999 | Hallmark et al. |
| 5,966,686 | A | 10/1999 | Heidorn et al. |
| 6,041,177 | A | 3/2000 | Kawabe et al. |
| 6,212,677 | B1 | 4/2001 | Ohkubo et al. |
| 6,219,833 | B1 | 4/2001 | Solomon et al. |
| 6,279,149 | B1 | 8/2001 | Field et al. |
| 7,174,536 | B1 * | 2/2007 | Kothari .............. G06F 11/3664 717/109 |
| 8,161,463 | B2 * | 4/2012 | Johnson ................. H04L 9/002 717/136 |
| 10,402,547 | B2 * | 9/2019 | Joseph Johnson .... G06F 21/125 |

OTHER PUBLICATIONS

Abramson, D., et al., "Relative Debugging: A New Methodology for Debugging Scientific Applications", Communcations of the ACM, 39 (11), pp. 69-77, (Nov. 1996).

Ahmad, I., et al., "Automatic Parallelization and Scheduling of Programs on Multiprocessors using CASCH", IEEE Publication, No. 0190-3918/97, pp. 288-291, (1997).

Ahmed, S., et al., "The Linda Program Builder", Proceedings of the 3rd Workshop on Languages and Compilers for Parallelism, MIT Press, pp. 1-18, (1991).

Anderson, J.M., et al., "Global Optimizations for Parallelism and Locality on Scalable Parallel Machines", ACM SIGPLAN Notices, 28 (6), pp. 112-125, (Jun. 1993).

Anthes, R.A., et al., "Development of Hydrodynamic Models Suitable for Air Pollution and Other Mesometeorlogical Studies", Monthly Weather Review, 106 (8), pp. 1045-1078, (Aug. 1978).

Banatre, J., et al., "The Gamma Model and Its Discipline of Programming", Science of Computer Programming, 15, pp. 55-77, (Nov. 1990).

Banerjee, U., et al., "Automatic Program Parallelization", Proceedings of the IEEE, 81, pp. 211-243, (Feb. 1993).

Beletsky, V., et al., "A Package for Automatic Parallelization of Serial C-Programs for Distributed Systems", IEEE Publication, No. 0-8186-7177, pp. 184-188, (Jul. 1995).

Bodin, F., et al., "Sage ++: An Object-Oriented Toolkit and Class Library for Building Fortran and C++ Restructuring Tools", Technical Report, Deptartment of Computer Science, Indiana University, pp. 1-16, (1993).

Bowdidge, R.W., et al., "Supporting the Restructuring of Data Abstractions through Manipulation of a Program Visualization", ACM Transactions on Software Engineering and Methodology, 7 (2), pp. 109-157, (Apr. 1998).

Cheng, D.Y., "A Survey of Parallel Programming Tools", Technical Report RND-91-005, NASA Ames Research Center, Moffet Field, CA, pp. 1-70, (1993).

Derra, S., "Breaking the Code", Inside Iowa State, 2 p., (Mar. 21, 1997).

Di Martino, B., et al., "Towards Automated Code Parallelization through Program Comprehension", IEEE Publication, No. 0-8186-5647, pp. 108-115, (Jun. 1994).

Dongorra, J.J., et al., "Environments and Tools for Parallel Scientific Computing", Advances in Parallel Computing, 6, Table of Contents Only, pp. I-XVI, (1993).

Ernst, M.D., et al., "Slicing pointers and procedures (abstract)", Microsoft Research Technical Report MSR-TR-95-23, Microsoft Research, Redmond, WA, pp. 1-16, (1995).

Friedman, R., et al., "Fortran Parallelization Handbook", Preliminary Edition, Applied Parallel Research, Sacramento, CA, pp. 1-86, (Apr. 1995).

Goldberg, A., et al., "Specification and Development of Parallel Algorithms with the Proteus System", DIMACS, 18, pp. 383-399, (May 1994).

Hiranadani, S., et al., "The D Editor: A New Interactive Parallel Programming Tool", Proceedings of Supercomputing Conference, Washington, D.C., pp. 733-742, (Nov. 1994).

Huelsbergen, L., et al., "Dynamic Program Parallelization", ACM Publication, No. 0-89791-483, pp. 311-323, (1992).

Jackson, D., et al., "Abstraction Mechanisms for Pictorial Slicing", IEEE Publication, pp. 82-88, (1994).

Kessler, C.W., et al., "Pattern-Driven Automatic Program Transformation and Parallelization", IEEE Publication, No. 1066-6192, pp. 76-83, (1995).

Kothari, S.C., et al., "1998 Progress Report: Parallelization Agent for Legacy Codes in Environmental Modeling", National Center for Environmental Research and Quality Assurance http://es.epa.gov/ncerga/progress/kothari98.html, 1-3, p., (1998).

Kothari, S.C., et al., "Optimal Designs of Linear Flow Systolic Architectures", Proceedings of the International Conference on Parallel Processing, vol. I Architecture, Pennsylvania State University Press, University Park, Pennsylvania, pp. 247-256, (Aug. 8-12, 1989).

Kothari, S.C., et al., "Parallelization Agent for Atmospheric Models", Proceedings of the Symposium on Regional Weather Prediction on Parallel Computer Environments, SKIRON, University of Athens, Greece, 1-10 p., (Oct. 1997).

Kothari, S.C., et al., "Parallelization Agent for Legacy Codes in Environmental Modeling", Application for Federal Assistance, 33 p., (Mar. 13, 1996).

Li, J., et al., "The Data Alignment Phase in Compiling Programs for Distributed-Memory Machines", Journal of Parallel and Distributed Computing, 13 (2), pp. 213-221, (Oct. 1991).

Massingill, B., "Mesh Computations", Tech Report, CalTech Technical Report, pp. 1-35, (1995).

Messina, P., et al., "System Software and Tools for High Performance Computing Environments", A Society for Industrial and Applied Mathematics Publication, Philadelphia, Table of Contents Only, pp. 1-9, (1993).

Mitra, S., "A Class-based Approach to Parallelization of Legacy Codes", Iowa State University Dissertation, Ames, IA, 1-50 p., (1997).

Ning, J.Q., et al., "Automated Support for Legacy Code Understanding", Communications of the ACM, 37 (5), pp. 50-57, (May 1994).

Reps, T., et al., "Precise Interprocedural Choppin", Proc. of the 3rd ACM Symp. on Foundations of Software Engineering, Washington, DC, 12 p., (Oct. 1995).

Reps, T., et al., "Speeding up Slicing", Proc. of the 2nd ACM SIGSOFT Symp. on Foundations of Software Engineering, New Orleans, LA, pp. 11-20, (Dec. 1994).

Skillicom, D.B., "Architecture-Independent Parallel Computation", IEEE Computer Society, 28, pp. 38-51 (Dec. 1990).

Snyder, L., "A Practical Parallel Programming Model", DIMACS, 18, pp. 143-160, (May 1994).

Valiant, L.G., "A Bridging Model for Parallel Computation", Communications of the ACM, 33 (8), pp. 103-111, (Aug. 1990).

Watts, T.M., et al., "Techniques for Integrating Parallelizing Transformations and Compiler Based Scheduling Methods", IEEE Publication, No. 1063-9535, pp. 830-839, (1992).

Williams, R.D., "DIME: A Programming Environment for Unstructured Triangular Meshes on a Distributed-Memory Parallel Processor", The Third Conference on Hypercube Concurrent Computers and Applications, vol. II, pp. 1770-1787, (Jan. 1988).

Yang, J.A., et al., "Parallel-Program Transformation using a Metalanguage", ACM Publication, No. 0-897910-390-6, pp. 11-20, (Jun. 1991).

* cited by examiner

METHOD FOR ANALYZING AND VERIFYING SOFTWARE FOR SAFETY AND SECURITY

CROSS-REFERENCE TO RELATED APPLICATIONS

This application claims priority to U.S. Provisional Patent Application No. 63/031,952, filed on May 29, 2020, the entirety of which is hereby incorporated herein by reference.

COMPUTER PROGRAM LISTING APPENDIX

A computer program listing appendix on compact disc is included in the application. The material stored on the compact discs is hereby incorporated by reference in its entirety. Two copies of the computer program listing appendix are submitted on two compact discs that are labelled "Copy 1" and "Copy 2." Copy 1 and Copy 2 are identical. The machine format of each compact disc is Macintosh/IBM-PC. The operating system compatibility is MS-Windows, Macintosh, and Linux. The file contained on each compact disc is named gas-installation.zip, a file of 571.1 MB, created on May 26, 2020.

FIELD OF THE INVENTION

This invention relates generally to methods for analyzing and verifying software for safety and security. In particular, this invention provides for methods of computing a compact representation for all possible behaviors of software when it executes and verifying that software will not malfunction using the compact representation.

BACKGROUND

Software engineers collectively spend billions of hours each year maintaining and evolving software, much of which can grow into very large sets of code. For example, Linux 1.0.0 comprises approximately 176,250 lines of code. Linux 5.5.6 comprises approximately 27.8 million lines of code with an estimated 12,993 lines added per day, 4,958 lines deleted per day, 2,830 lines modified per day, and 4,189 different contributors in 2019. A printed version of Linux 5.5.6 would be a 250 foot tall stack of paper. Even more daunting than the number of lines of code is the number of execution behaviors produced by the software. Conditional statements and loop instructions can make the number of execution behaviors exponential with respect to the number of lines of code. In a program with n IF statements, the number of execution behaviors can be $2^n$. As an example, if one loop with five IF statements iterates 50 times, the number of execution behaviors is larger than the estimated number of atoms in the universe, and enumerating all execution behaviors would be impossible.

People rely heavily on software in their daily lives. When software crashes or otherwise does not behave as intended, the resulting errors can vary from inconvenience to catastrophe. In late 2019, there were several examples of hackers gaining control of Ring cameras, watching activities occurring in private homes, and even communicating with young children in their bedrooms. In March 2019, aviation authorities around the world grounded the Boeing 737 MAX passenger airplane after 346 people died in two crashes caused by malfunctioning flight control software. From the widespread use of software in our daily lives and the severe consequences that can occur from software malfunctions, it can be seen that the tasks of analyzing and verifying software for safety and security are vitally important.

Most software development does not involve writing code from scratch, but instead involves maintaining existing software. Software evolution and maintenance involves three primary categories of tasks. The first category is understanding software, which means gaining the necessary knowledge to relate the software to the application it implements. This is especially important because the documentation for the software is often incomplete, obsolete, or both. The second category is analyzing software, which means deriving from software the necessary control and dataflow information to reason about the correctness of the software. The third category is verifying software, which means applying rigorous techniques to establish correctness of software based on the control and dataflow information.

One common method for analyzing and verifying software is analyzing the software by actually running the program, often referred to as software testing. The software is run under various conditions and with various inputs and then observing whether it performs as expected. However, only a very small fraction of the execution behaviors can be analyzed in this manner. Testing all behaviors is usually impossible, and errors are missed because relevant behaviors are not tested.

Another common method for analyzing and verifying software is analyzing the software without running the program, often referred to as static analysis. The analysis relies on approximations to simulate execution behaviors, but the approximations are error prone computations which in turn introduce many errors. Moreover, improving the accuracy of the approximations leads to enormous increase in the size of computation required for verifying software using static analysis, which often grows so large that the verification cannot be completed.

Current methods of analysis and verification also lack artifacts to facilitate holistic understanding of results produced by a computation analysis. They also lack capabilities to enable human-in-loop automation to address challenges that are otherwise intractable.

For at least the reasons described, a compact representation of execution behaviors and improved methods for understanding, analyzing, and verifying software for safety and security are needed.

BRIEF SUMMARY

In accordance with various embodiments of the invention, a computer implemented method for analyzing and verifying software for safety and security is provided. In one embodiment, a program comprising a sequence of program statements for execution by a processor of a computing device is provided. A compact representation of the execution behaviors of the program is computed. Computing the compact representation involves assigning to each program statement S an unknown X, setting up a system of linear equations, and solving the system of linear equations. The solution obtained from solving the system of linear equations is then translated using statement IDs to obtain the compact representation.

The compact representation is further reduced so that it represents only the execution behaviors that are relevant to the property being verified. This reduction is achieved by applying an algebraic homomorphism. The subset of non-control program statements that are relevant to a property of the software to be verified is identified. A homomorphic image of the compact representation is computed using the relevant statements. The homomorphism maps non-relevant program statements to an identity representing null behavior. The property is then verified using the homomorphic image of the compact representation.

BRIEF DESCRIPTION OF THE DRAWINGS

Figure 1:
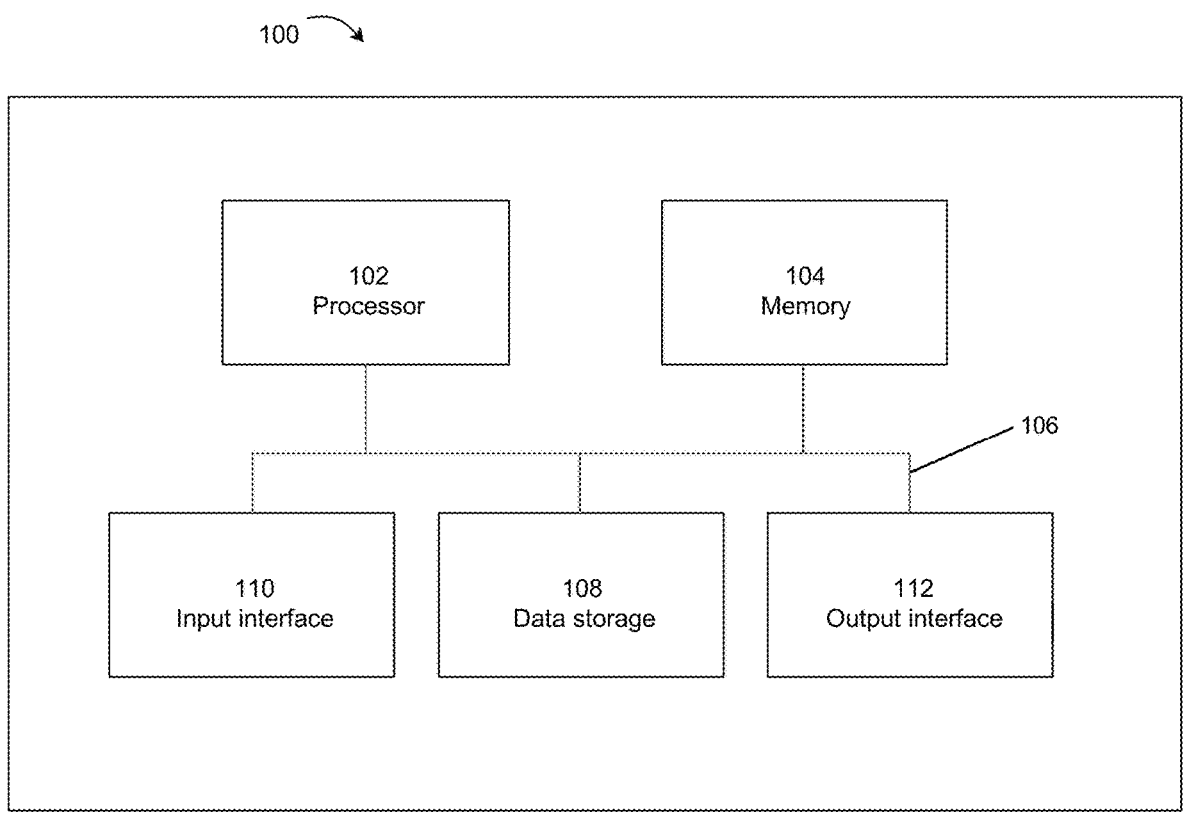

Having thus described the invention in general terms, reference will now be made to the accompanying drawings, which are not necessarily drawn to scale, and wherein:

FIG. 1 illustrates an example of a computing device configured to implement methods for analyzing and verifying software for safety and security in accordance with an embodiment of the invention.

Figure 2:
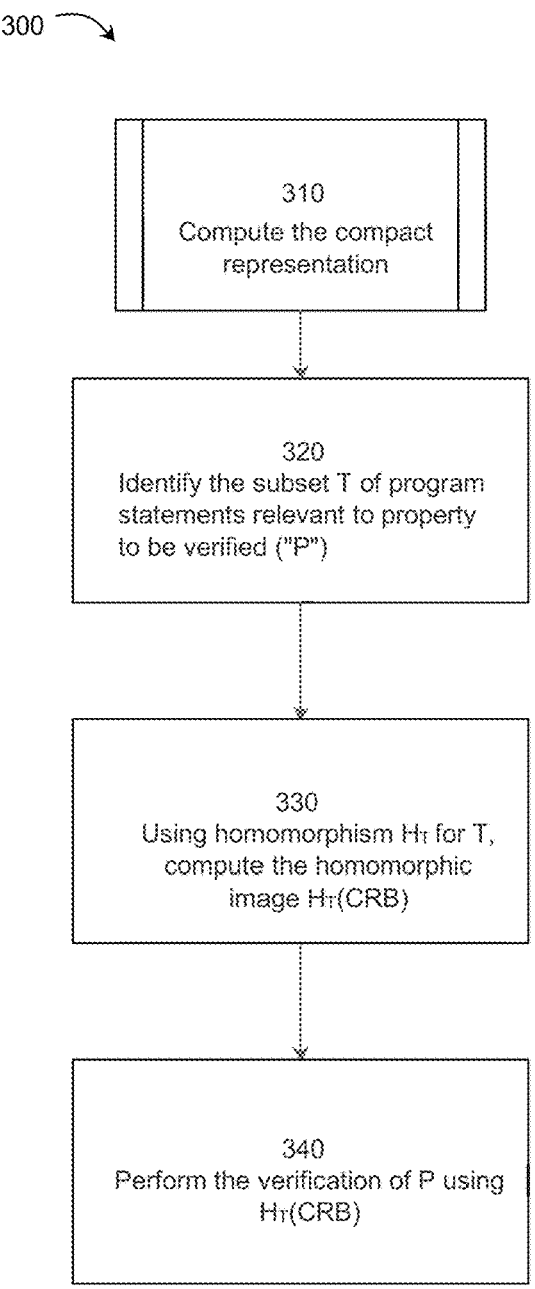

FIG. 2 illustrates a method for analyzing and verifying software for safety and security in accordance with an embodiment of the invention.

Figure 3:
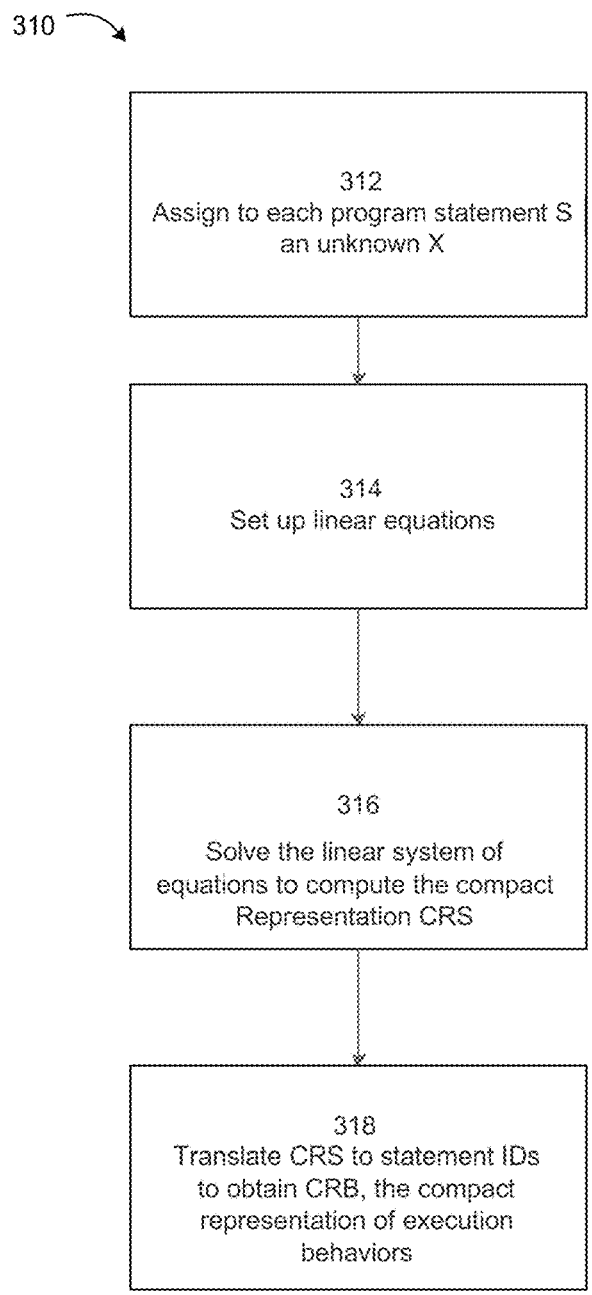

FIG. 3 illustrates a method for computing a compact representation of execution behaviors of software in accordance with an embodiment of the invention.

Figure 4:
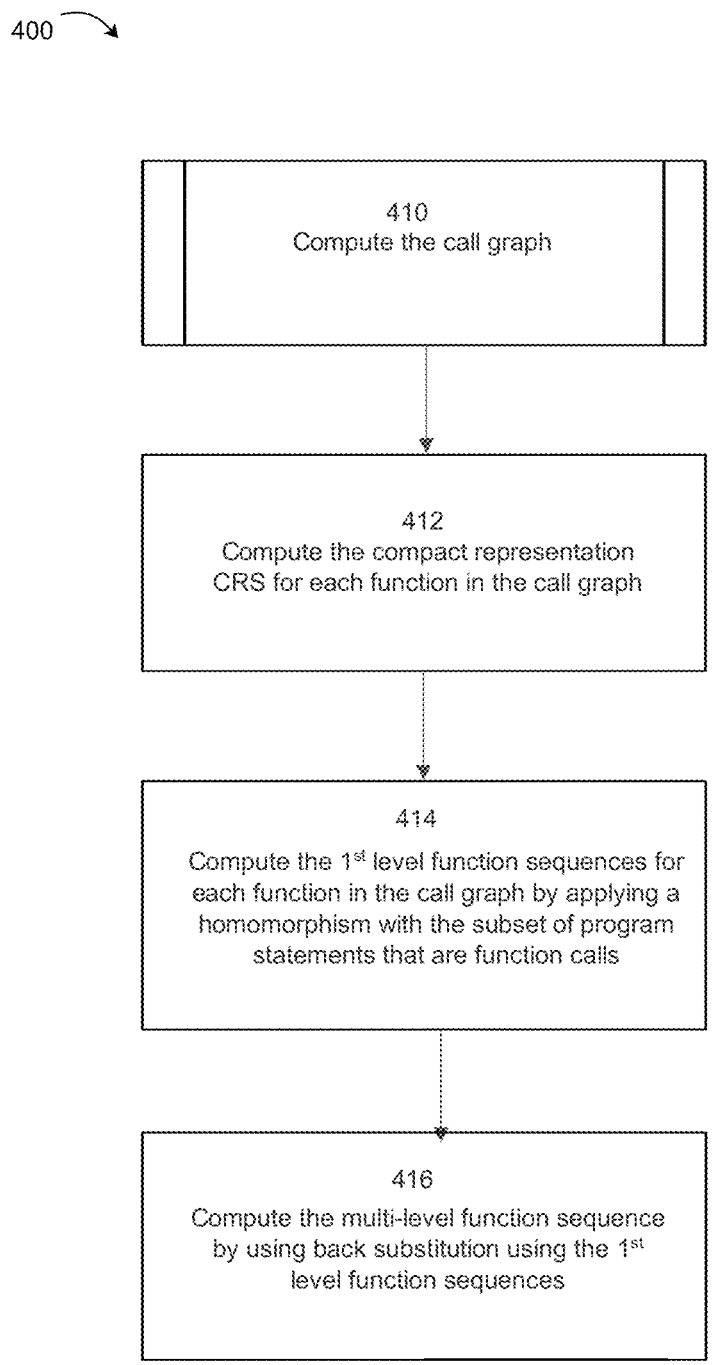

FIG. 4 illustrates a method for computing multi-level function sequences for analyzing software in presence of function (method) calls with many levels of nesting in accordance with an embodiment of the invention.

Figure 5:
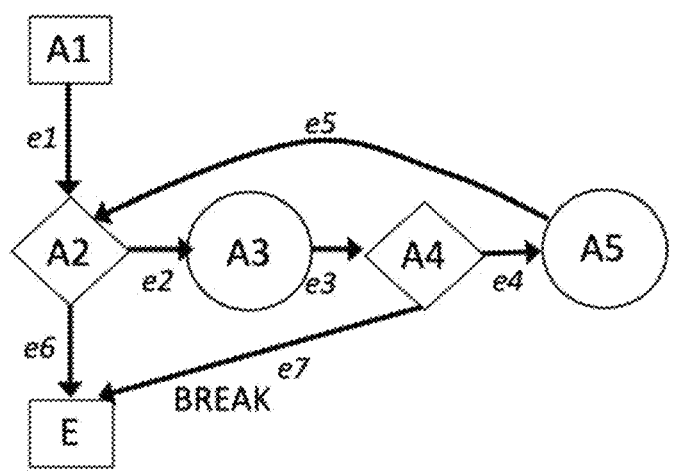

FIG. 5 illustrates an unstructured program loop graph with multiple exits and the CRS for it in accordance with an embodiment of the invention.

Figure 6:
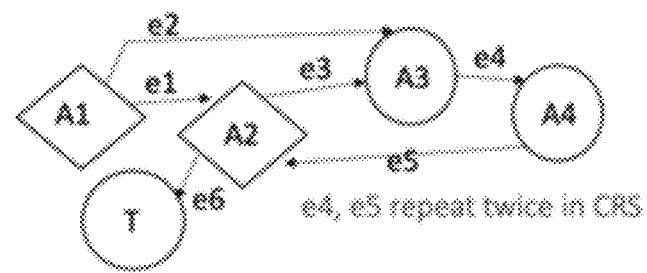

FIG. 6 illustrates an unstructured program loop graph with multiple entries and the CRS for it in accordance with an embodiment of the invention.

Figure 7:
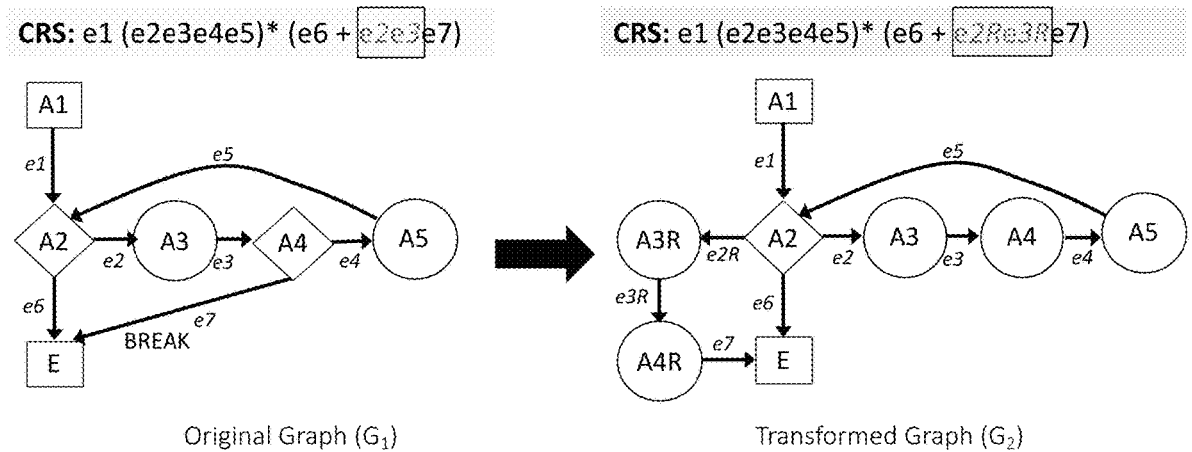

FIG. 7 illustrates a transformation from an unstructured graph with multiple exits to a structured graph in accordance with an embodiment of the invention.

Figure 8:
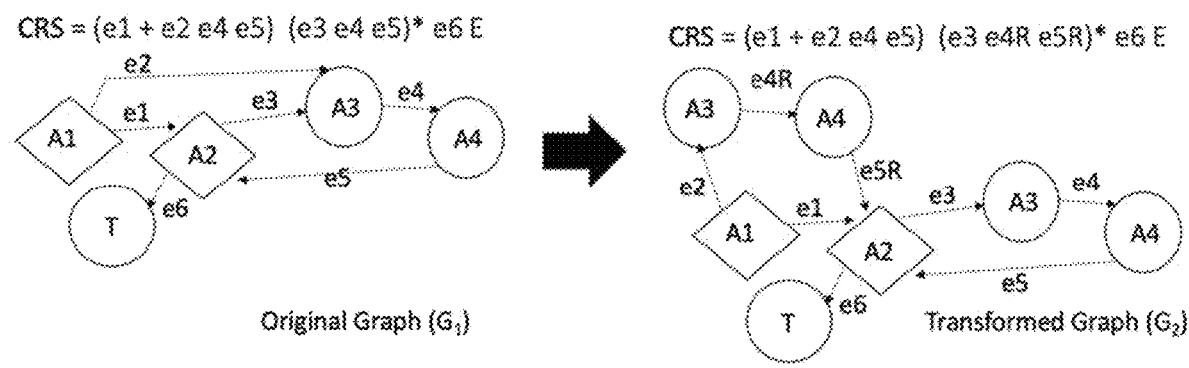

FIG. 8 illustrates a transformation from an unstructured graph with multiple entries to a structured graph in accordance with an embodiment of the invention.

Figure 9:
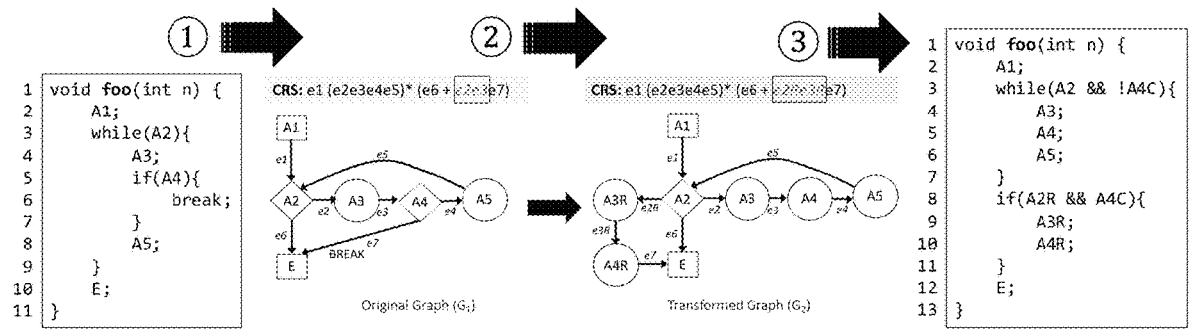

FIG. 9 illustrates a program Transformation Using Graph Transform in accordance with an embodiment of the invention.

Figure 10:
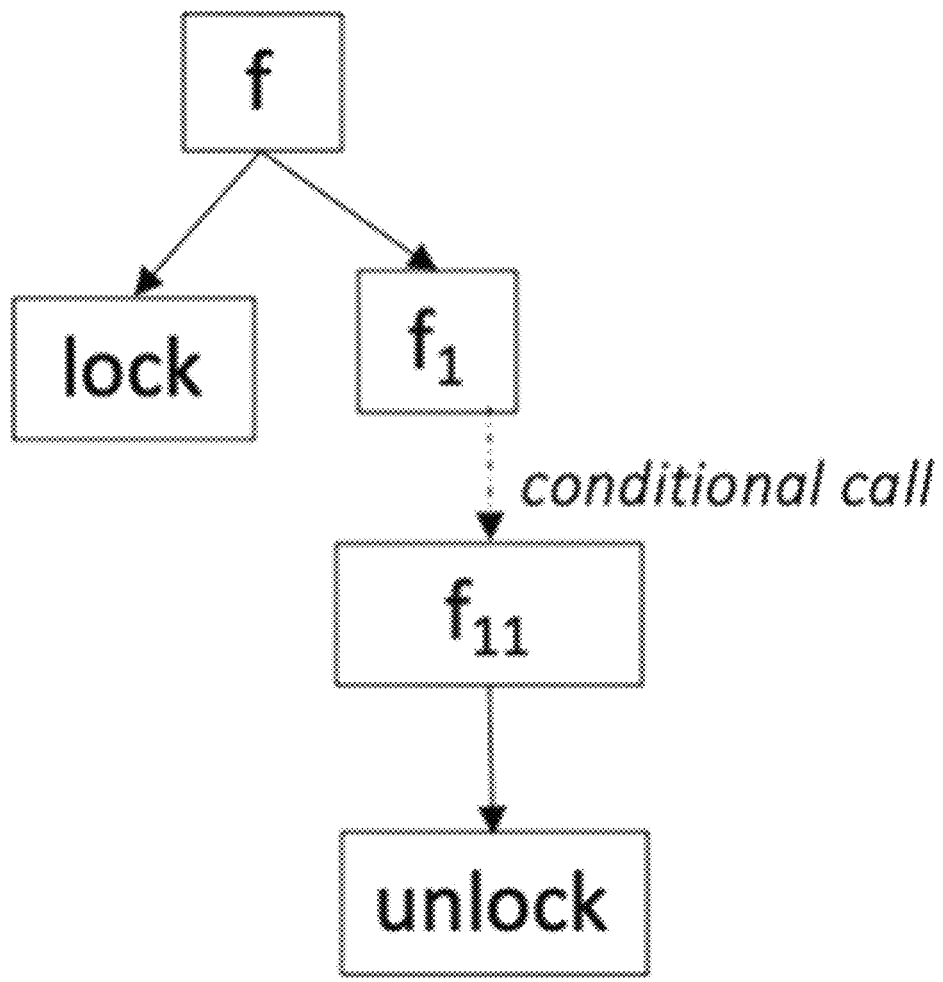

FIG. 10 illustrates a call graph for a code set in accordance with an embodiment of the invention.

DETAILED DESCRIPTION

Some embodiments of the present invention will now be described more fully hereinafter with reference to the accompanying drawings, in which some, but not all, embodiments of the invention are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the apparatus are not shown in one or more of the figures for clarity and to facilitate explanation of embodiments of the present invention.

In accordance with one embodiment, a method of analyzing and verifying software for safety and security is disclosed. The methods described present an algebraic foundation that enables a new generation of computational methods for software analysis and verification. This algebraic foundation enables a compact representation of all execution behaviors, which can then be analyzed using algebraic homomorphisms. Software safety and security verification require analysis of all execution behaviors. Accuracy of current analysis techniques inherently depends on enumeration of execution behaviors, which is often an intractable problem even for small software. The disclosed algebraic approach can achieve high accuracy without enumerating all behaviors.

As shown in FIG. 1, a high-level illustration of an example of a computing device 100 that can be used to implement the disclosed methods is provided. In one embodiment, the computing device 100 may be used in a system that supports analyzing and verifying software for safety and security. The computing device 100 includes at least one processor 102 that executes instructions that are stored in a memory 104. In addition to storing executable instructions, the memory 104 may also store graphical data, or other types of data. The memory 104 may comprise RAM, ROM, EEPROM, Flash memory, or any other suitable memory. The instructions may be, for instance, instructions for implementing functionality described as being carried out by one or more components of computing device 100, instructions for executing software program statements, or other instructions for implementing one or more of the disclosed methods. The processor 102 may access the memory 104 by way of a system bus 106. The computing device 100 additionally includes a data storage device 108 that is accessible by the processor 102 by way of the system bus 106. The data storage device 108 may comprise any suitable computer-readable storage, including a hard disk, memory, NAS, or other storage device. The data storage device 108 may store executable instructions, graphical data, or other data. The computing device 100 also includes an input interface 110 that allows external devices to communicate with the computing device 100. For instance, the input interface 110 may be used to receive instructions from an external computer device, user, or other device capable of communicating with computing device 100. The computing device 100 also includes an output interface 112 that interfaces the computing device 100 with one or more external devices. For example, the computing device 100 may display text, images, or other data or information by way of the output interface 112. While shown as a single system, computing device 100 may be a distributed system without departing from the scope of the disclosure. For example, several devices may be in communication by way of a network connection and may collectively perform any task described as being performed by the computing device 100.

The working parts of software include a sequence of executed instructions for each program run and the state or content of memory 104 due to each instruction in the sequence. The term program refers to a set of instructions arranged to follow certain structural constraints. The term (execution) behaviors refers to sequences of executed instructions during different runs of the program. Programs are written using programming languages. C, C++, and Python are well known programming languages, but there are many more languages. Each language has syntax rules, which are rules for specifying structural constraints, and semantics, which are the knowledge for conducting executions based on the syntax.

Example: Division by Zero

To illustrate the method, a sample program called "sample code set #1" is provided in Table 1 below. A line number precedes each line of code, but is for descriptive purposes only and is not part of the executable code of sample code set #1.

TABLE 1 sample code set #1

| | |
|---|---|
| 1 | int main (int a1, int a2, bool c1, bool c2, bool c3) { |
| 2 (B) | int x, d, y, z; |
| 3 | x = a1 + a2; |
| 4 | d = a2; |
| 5 | if (c1) { |
| 6 | x = a1; |
| 7 | } |
| 8 | if (c2) { |
| 9 | if (c3) { |
| 10 | y = a1; |
| 11 | } else { |
| 12 | d = d - a1; |
| 13 | } |
| 14 | } else { |
| 15 | d = d + 1; |
| 16 | } |
| 17 | z = x/d; |
| 18 (E) | } |
| 19 | |

To determine if this program will crash, it is necessary to analyze all execution behaviors for varying combinations of Boolean values for conditions found at lines 5, 8, and 9 and also for varying combinations of integer values between 1 and $2^{32}$ for inputs a1 and a2. The number of program runs required to detect a software vulnerability can be enormous because of the large number of combinations of execution behaviors and the number of possible program inputs. With sample code set #1, one could generate inputs using a random number generator that generates integers between 1 and $2^{32}$. Even with this short program, it would take approximately one trillion test runs to detect the division by zero vulnerability at line 17 with a probability of 0.9. The fraction of inputs that can cause the vulnerability is $1/2^{32}$. Given such inputs, the fraction of behaviors that can produce the division by zero vulnerability is $1/3$. Searching for the fraction of inputs that can cause the vulnerability, and given such inputs searching for the fraction of behaviors that can produce the vulnerability are factors that contribute to the high cost of software testing. Software analysis should help in understanding which inputs and behaviors can cause the vulnerability. The challenge is to test smarter in order to catch all vulnerabilities while testing as little as possible.

Program statements are present at lines B, 3, 4, 5, 6, 8, 9, 10, 12, 15, 17, and E. A truth table describing the execution behavior of sample code set #1 is provided in Table 2.

TABLE 2 truth table showing execution behaviors for sample code set #1

| Line 5 | Line 8 | Line 9 | Execution Behaviors |
|---|---|---|---|
| T | T | T | B, 3, 4, 5(T), 6, 8(T), 9(T), 10, 17, E |
| T | T | F | B, 3, 4, 5(T), 6, 8(T), 9(F), 12, 17, E |
| T | F | T | B, 3, 4, 5(T), 6, 8(F), 15, 17, E |
| T | F | F | B, 3, 4, 5(T), 6, 8(F), 15, 17, E |
| F | T | T | B, 3, 4, 5(F), 8(T), 9(T), 10, 17, E |
| F | T | F | B, 3, 4, 5(F), 8(T), 9(F), 12, 17, E |
| F | F | T | B, 3, 4, 5(F), 8(F), 15, 17, E |
| F | F | F | B, 3, 4, 5(F), 8(F), 15, 17, E |

The possible conditions of lines 5, 8, and 9 are listed in the left three columns of Table 2, and the execution behaviors that will result from those conditions are listed in the right-most column of Table 2. Each row of the truth table describes one execution behavior, and the lines are read from left to right. As an example of how to read the execution behaviors, in the first line of Table 1, the condition in line 5 is true, the condition in line 8 is true, and the condition in line 9 is true. Based on these conditions, line 2 (B or begin) is executed, then line 3 is executed, then line 4 is executed, the condition is true at line 5, then line 6 is executed, the condition is true at line 8, the condition is true at line 9, then line 12 is executed, then line 17 executed, and finally line 18 (E or end) is executed. All lines of Table 2 are read in a similar manner.

Truth tables are commonly used to examine behavior of a program; however truth tables require exponential space and require exponential time to answer questions about execution behaviors. Even small programs without loops can lead to exponentially many execution behaviors. With loops, the number of execution behaviors can be as good as infinite.

As shown in FIG. 2, a method for software verification 300 is provided. The method 300 begins with providing a software program that is made up of a sequence of program statements to be executed by a processor 102 of a computing device 100. At step 310 a compact representation, referred to as "CRS" is computed for the program. Step 310 is a subroutine with its method steps depicted in FIG. 3. The goal of the software verification method 300 is to verify a property referred to as "P."

Computing the Compact Representation

To represent the execution behaviors of software in a simple and compact manner, one key enabler is a compact representation or artifact referred to as "CRS" for representing all possible execution behaviors. CRS is an algebraic representation or artifact based on a novel algebra designed for the purpose of representing execution behaviors. The algebra is a non-commutative ring defined over elements that can be interpreted as elements of the successor, a binary relation defined over program instructions. Algebra operations used in the compact representation are addition or +, multiplication, *, and division.

The first algebra operation, addition or +, can be expressed as a+b where a and b represent sets of execution behaviors, and the execution behavior could be behavior in a or behavior in b. In the following example:

$$C(\text{Expression1}+\text{Expression2})$$

C is a condition in an IF statement, and Expression1 and Expression2 represent sets of behaviors that occur depending on whether C is true or false. Expression1 represents the behavior that occurs if C is true, and Expression2 represents the behavior that occurs if C is false. The statement C(Expression1+Expression2) may alternatively be expressed as C(T)Expression1+C(F)Expression2. Addition is interpreted as union. For example, a and b are sets of behaviors then a+b is interpreted as behavior a or behavior b.

The algebra operation multiplication works as shown in the following example:

$$ab$$

The multiplication is interpreted as followed-by. For example, in the preceding example a and b are sets of behaviors then a b (a multiplied by b) is interpreted as behavior a followed by behavior b. The multiplication is non-commutative. There is a multiplicative identity $1_m$ such that Expression1 $1_m$=$1_m$ Expression1=Expression1. The multiplicative identity may be denoted as $1_m$ or 1. Multiplication is distributive over addition.

The algebra operation * corresponds to division. The division is interpreted as loop. For example, a is a set of behaviors then $1/(1-a)=\Sigma_{i=0}^{\infty} a^i$ which is a iterated as 0 or more times, and it is denoted by a*. The operation is illustrated by the following example:

(Expression)*

In the preceding example, Expression may repeat zero or more times.

The relationship between division and the * operation is as follows. The division operation is used in the presence of loops. Loops lead to equations of the form X=aX+b. To solve for X, division by the left multiplicative inverse of (1−a) is necessary. An identity with an infinite series (1−a) $(\Sigma_{i=0}^{i=\infty} a^i)=1$ gives $1/(1-a)=\Sigma_{i=0}^{i=\infty} a^i$ which is a iterated 0 or more time, denoted as a* using the Kleene*operator. X=(1/(1−a)) b=a*b.

Another key enabler for a compact representation of execution behaviors is an efficient method for computing CRS by solving a linear system of equations. The equations are set up with one unknown for each program statement. The solution for a statement represents the partial execution behaviors starting at that statement. The solution for the first statement is the CRS; it represents complete behaviors starting at the beginning. The solutions are obtained by the so-called back substitutions for solving a linear system of equations. Computing the CRS is very efficient because the computation time for back-substitutions is linear, i.e. it is proportional to the number of program statements.

The coefficients of the equations are successor elements and the CRS is an algebraic expression over the successor elements. The converted to CRB (compact representation of behaviors) by mapping each successor element (p q) to the program statement p. Note that the successor elements are a set of pairs of program statements (p q) such that q succeeds p during a program execution.

Using CRS, efficient and accurate methods can be designed to analyze and verify software. These methods are enabled by algebraic homomorphisms defined on CRS. Algebraic homomorphisms are a key concept in mathematics. Algebraic homomorphisms are designed to retain key information relevant to proving a given mathematical property. In the algebra for software, the property is about security or safety. Using algebraic homomorphisms, one can determine what is crucial in solving a theorem, create a homomorphic structure, and proceed. The key idea is retaining the critical information, which is done by creating a homomorphism. In the method 300, homomorphisms in which a subset of the algebra elements are mapped to the multiplicative identity 1 will typically be used.

To allow for the compact representation to be determined by a computer, computing the compact representation 310 formulates a system of linear equations and obtains the compact representation by solving the system of equations. As shown in FIG. 3, a method 310 for computing the compact representation CRS begins at step 312 with assigning to each program statement, referred to as a, a variable identified as $X_a$.

At step 314, a system of linear equations is set up. In mathematics, semantics are usually captured using a binary relation. Given a set S, a binary relation R is a subset of the cross-product S×S. For example, the semantics of siblings are captured as the following:

A: set of humans
B: a subset of pairs (x y) where x and y are siblings

In the context of a program, the successor relation can be expressed as follows:

S: set of program statements
The successor relation R is a subset of S×S such that e=(p q) belongs to R if and only if program statement q follows program statement p in an execution sequence If a program statement referred to as a has a unique successor program statement b, and $e_i$=(a b) then the linear equation is $X_a=e_iX_b$. The expression $e_i$ is an algebra element that is interpreted as a successor relation between a and b indicating that b could be a successor of a in an execution behavior. If a has two successor statements b and c, and $e_i$=(a b) and $e_j$=(a c), then the linear equation is $X_a=e_iX_b+e_jX_c$ where $e_i$ and $e_j$ are algebra elements that are interpreted as successor relations between b, c, and a indicating that b and c could be successors of a in an execution behavior. For a program with n program statements, setting up the system of linear equations in step 314 is O(n).

At step 316, the system of equations set up in step 314 are solved using back substitutions to obtain solutions. For a program with n program statements, solving the system of linear equations in step 316 is O(n); however the complexity depends on the structure of the coefficient matrix, and at worst is $O(n^3)$. Since the number of successor elements is typically 1.5 per program statement. As a result, solving the system of linear equations in step 316 is O(n).

At step 318, the solution to the system of equations obtained at step 316 is translated to statement IDs or execution behaviors to obtain the compact representation CRB. For a program with n program statements, the translation performed at step 318 is O(n).

Computing the compact representation CRB for sample code set #1

For sample code set #1, CRB is denoted as follows:

CRB=*B*3 4C1(6+1)C2(C3(10+12)+15)17*E*

In this case, CRB is interpreted in the following manner: line 2 (B or begin) is executed, then line 3 is executed, then line 4 is executed, then the condition found in line 5, which is denoted condition C1, is encountered. If C1 is true, then line 6 is executed. If C1 is false, then nothing happens and the program proceeds. The term 1 in C1(6+1) is an identity, meaning that nothing happens as a result of C1 being false. The condition found in line 8, which is denoted C2, is then encountered. If C2 is true, then the condition of line 9, which is denoted C3, is encountered. If C3 is true, then line 10 is executed. If C3 is false, the line 12 is executed. If C2 is false, then line 15 is executed. Then line 17 is executed, and then line 18 (E or end) is executed. CRB can be expanded to be rewritten as the following statement:

CRB=*B*3 4(C1(*T*)6+C1(*F*))(C2(*T*)C3(10+12)+C2(*F*)15)17*E*

CRB can be further expanded to be rewritten as the following statement:

CRB=*B*3 4(C1(*T*)6+C1(*F*))(C2(*T*)(C3(*T*)10+C3(*F*)12)+C2(*F*)15)17*E*

CRB can be expanded one more time to be rewritten as the following statement:

CRB=*B*3 4(C1(*T*)6+C1(*F*))(C2(*T*)(C3(*T*)10+C2(*T*)C3(*F*)12)+C2(*F*)15)17*E*

From the previous line, it can be seen that the following six unique execution behaviors are possible for sample code set #1:

Execution behavior 1: B 3 4 C1(T) 6 C2(T) C3(T) 1017 E
Execution behavior 2: B 3 4 C1(T) 6 C2(T) C3(F) 1217 E
Execution behavior 3: B 3 4 C1(T) 6 C2(F) 1517 E
Execution behavior 4: B 3 4 C1(F) C2(T) C3(T)1017 E
Execution behavior 5: B 3 4 C1(F) C2(T) C3(F) 1217 E
Execution behavior 6: B 3 4 C1(F) C2(F) 1517 E Based on this list of unique execution behaviors, the truth table originally presented as Table 2 can be updated as shown in Table 3.

TABLE 3 updated truth table showing unique execution behaviors CRB

| Line 5 (C1) | Line 8 (C2) | Line 9 (C3) | Execution Behaviors | Execution Behaviors from CRB |
|---|---|---|---|---|
| T | T | T | B, 3, 4, C1(T), 6, C2(T), C3(T), 10, 17, E | 1 |
| T | T | F | B, 3, 4, C1(T), 6, C2(T), C3(F), 12, 17, E | 2 |
| T | F | T | B, 3, 4, C1(T), 6, C2(F), 15, 17, E | 3 |
| T | F | F | B, 3, 4, C1(T), 6, C2(F), 15, 17, E | 3 |
| F | T | T | B, 3, 4, C1(F), C2(T), C3(T), 10, 17, E | 4 |
| F | T | F | B, 3, 4, C1(F), C2(T), C3(F), 12, 17, E | 5 |
| F | F | T | B, 3, 4, C1(F), C2(F), 15, 17, E | 6 |
| F | F | F | B, 3, 4, C1(F), C2(F), 15, 17, E | 6 |

The compact representation CRB represents only the distinct behaviors of the code. The truth table can have the same behavior listed repeatedly because of the nested IF statements in the program, but this repetition is avoided with CRB.

At step 312 program statements are assigned variables as shown in Table 4.

TABLE 4 assignment of variables to program statements of sample code set #1

|      | 1       | int main (int a1, int a2, bool c1, bool c2, bool c3) |
|------|---------|---|
|      |         | { |
| X1   | 2 (B)   | int x, d, y, z; |
| X2   | 3       | x = a1 + a2; |
| X3   | 4       | d = a2; |
| X4   | 5       | if (c1) { |
| X5   | 6       | x = a1; |
|      | 7       | } |
| X6   | 8       | if (c2) { |
| X7   | 9       | if (c3) { |
| X8   | 10      | y = a1; |
|      | 11      | } else { |
| X9   | 12      | d = d - a1; |
|      | 13      | } |
|      | 14      | } else { |

TABLE 4-continued assignment of variables to program statements of sample code set #1

|      |         |   |
|------|---------|---|
| X10  | 15      | d = d + 1; |
|      | 16      | } |
| X11  | 17      | z = x/d; |
|      | 18 (E)  | } |
|      | 19      |   |

As can be seen in Table 4, the program statement in line 2 (B or begin) is assigned the variable X1, the program statement in line 3 is assigned the variable X2, the program statement in line 4 is assigned the variable X3, and so on.

At step 314, the following set of linear equations are set up:

$$X1 = e1 X2$$

$$X2 = e2 X3$$

$$X3 = e3 X4$$

$$X4 = (e4 X5 + e5 X6)$$

$$X5 = e6 X6$$

$$X6 = (e7 X7 + e8 X10)$$

$$X7 = (e9 X8 + e10 X9)$$

$$X8 = e11 X11$$

$$X9 = e12 X11$$

$$X10 = e13 X11$$

$$X11 = e14 E$$

For clarity, the system of linear equations for sample code set #1 is also shown in Table 5. The first (top) row of Table 5 shows the variable assigned to each program statement, the second (middle) row shows the corresponding successor elements, and the third (bottom) row shows the corresponding equations.

TABLE 5 variables, successor elements, and equations for sample code set #1

| B:X1 3:X2 | 3:X2 4:X3 | 4:X3 5:X4 | 5:X4 6:X5 8 X6 | 6:X5 8:X6 | 8:X6 9:X7 15:X10 |
|---|---|---|---|---|---|
| e1 = (B 3) | e2 = (3 4) | e3 = (4 5) | e4 = (5 6) e5 = (5 8) | e6 = (6 8) | e7 = (8 9) e8 = (8 15) |
| X1 = e1 X2 | X2 = e2 X3 | X3 = e3 X4 | X4 = (e4 X5 + e5 X6) | X5 = e6 X6 | X6 = (e7 X7 + e8 X10) |
| 9:X7 10:X8 12:X9 | 10:X8 17:X11 | 12:X8 17:X11 | 15:X10 17:X11 | 17:X11 E |
| e9 = (9 10) e10 = (9 12) | e11 = (10 17) | e12 = (12 17) | e13 =(15 17) | e14 = (17 E) |
| X7 = (e9 X8 + e10 X9) | X8 = e11 X11 | X9 = e12 X11 | X10 = e13 X11 | X11 = e14 E |

At step 316, the system of linear equations set up at step 314 are solved by performing back substitution as follows:

$$X8 = e11 e14 E$$

$$X9 = e12 e14 E$$

$$X10 = e13 e14 E$$

$$X7 = (e9 e11 + e10 e12) e14 E$$

$$X6 = (e7 X7 + e8 X10)$$

$$X6 = (e7(e9 e11 + e10 e12 E) + e8 e13) e14 E$$

$$X4 = (e4 X5 + e5 X6)$$

$$X4 = (e4 e6 X6 + e5 X6)$$

$$X4=(e4e6+e5)(e7(e9e11+e10e12)+e8e13)e14E$$

$$X1=e1e2e3(e4e6+e5)(e7(e9e11+e10e12)+e8e13)e14E$$

Thus, the compact representation with successor elements, referred to as "CRS," is:

$$e1e2e3(e4e6+e5)(e7(e9e11+e10e12)+e8e13)e14E$$

At step 318, the successor elements of the compact representation or CRS obtained at step 316 are translated to program statements such that $e_i$ maps to $n_1$ if $e_i=(n_1n_2)$. Thus, the compact representation is obtained as follows:
The successor elements can be expressed as:

$$e_1=(B3)$$

$$e_2=(34)$$

$$e_3=(45)$$

$$e_4=(56)$$

$$e_5=(58)$$

$$e_6=(68)$$

$$e_7=(89)$$

$$e_8=(815)$$

$$e_9=(910)$$

$$e_{10}=(912)$$

$$e_{11}=(1017)$$

$$e_{12}=(1217)$$

$$e_{13}=(1517)$$

$$e_{14}=(17E)$$

For example, the CRS $e_1\ e_2\ e_3(e_4+e_5)$ corresponds to the compact representation of behaviors (CRB):

$$B34(5(T)+5(F))$$

The CRB above represents the program behaviors [B, 3, 4, 5(T), 6] and [B, 3, 4, 5(F), 8].

For sample code set #1, the CRS is:

$$e1e2e3(e4e6+e5)(e7(e9e11+e10e12)+e8e13)e14E$$

The corresponding CRB is:

$$B34(5(T)6+5(F))(8(T)9(T)10+9(F)12)+8(F)15))17E$$

The CRB is multiplied according to the distributive property to obtain individual behaviors:
Term1: B 345(T) 68(T) 9(T) 1017 E
Term2: B 345(T) 68(T) 9(F) 1217 E
Term3: B 345(T) 68(F) 1517 E
Term4: B 345(F) 8(T) 9(T) 1017 E
Term5: B 345(F) 8(T) 9(F) 1217 E)
Term6: B 345(F) 8(F) 1517 E
Each term listed above denotes a distinct behavior.
Identifying the Subset of Relevant Program Statements After computing the CRB, the method 300 proceeds to step 320, identifying the subset of non-control program statements relevant to the property to be verified, P.
Identifying Relevant Program Statements for Sample Code Set #1

For sample code set #1, the program may fail due to the division by zero vulnerability in line 17 which will occur if d=0 when line 17 is executed. Therefore, the property P to be verified is division-by-zero (DBZ). The goal of verification is to verify whether the property holds, and if so produce all the execution behaviors for which the property holds.

For the DBZ property, the relevant program statements are those that affect the value of the variable d. The relevant statements are located at lines B, 4, 5, 8, 9, 12, 15, 17, and E, and these lines are thus identified as the subset of relevant program statements.
Compute a Homomorphism H to Verify Property P After identifying the subset of relevant program statements in step 320, the method 300 proceeds to step 330 in which a homomorphism referred to as "H" is computed. Homomorphism is computed to distil the relevant behaviors.

A homomorphism is a structure-preserving map, referred to as H, on an algebraic structure. H has the properties $H(x+y)=H(x)+H(y)$ and $H(xy)=H(x)F(y)$. The modulo operation on integers is an example of homomorphism.

In abstract algebra, homomorphisms are used to enable proofs, especially when infinitely many cases are to be considered. Homomorphisms distil the essentials for a good proof that avoids unnecessary complexity.

In software analysis, a homomorphism can distil the essentials for verifying a software safety or security property. Homomorphisms can significantly reduce the computation for verifying the property without sacrificing accuracy. Homomorphisms introduce simplifications that facilitate holistic understanding of analysis results.

An example of a useful homomorphism follows. Let T be a subset of program statements. $H_T$ homomorphism of R defined by T: for each statement a in T, map a successor element e to 1 of R if e=(a b). An example of a practical use of the homomorphism is: given a property P, compute a set of relevant program statements. T is the complement of the set of relevant program statements.

The goal of the software verification method 300 is to verify a property, P. $H_T(CRB)$ is the compact representation for execution behaviors relevant to the property to be verified. $H_T(CRB)$ is calculated by defining as above a homomorphism with respect to the set of relevant program statements.
Computing H(CRS)) for Sample Code Set #1

For sample code set #1, the property to be verified is the division by zero vulnerability contained in line 17. Computing H(CRS) 330 involves defining a homomorphism H that maps to 1 the statements that are not relevant to the division by zero vulnerability. Program statements are present at lines B, 3, 4, 5, 6, 8, 9, 10, 12, 15, 17, and E. As previously described with respect to step 320, relevant program statements are present at lines B, 4, 5, 8, 9, 12, 15, 17, and E. The complement of the relevant program statements is T={3, 6, 10}; thus lines 3, 6, and 10 contain the non-relevant program statements. $H_T$ denotes the homomorphism using T. $H_T(CRS)$ denotes the reduction of CRS using $H_T$. $H_T(CRS)$ is called the homomorphic image of CRS. When $H_T(CRS)$ is mapped to execution behaviors, the resulting behaviors are called the homomorphic behaviors and denoted as $H_T(CRB)$. The homomorphic behaviors distil the essentials for verifying software safety and security properties.

As previously described, the CRS for sample code set #1 can be written as follows:

$$e_1e_2e_3(e_4e_6+e_5)(e_7(e_9e_{11}+e_{10}e_{12})+e_8e_{13})e_{14}E$$

The successor elements can be expressed as:

$$e_1=(B3)$$

$$e_2=(34)$$

$e_3=(45)$ $e_4=(56)$ $e_5=(58)$ $e_6=(68)$ $e_7=(89)$ $e_8=(815)$ $e_9=(910)$ $e_{10}=(912)$ $e_{11}=(1017)$ $e_{12}=(1217)$ $e_{13}=(1517)$ $e_{14}=(17E)$

Mapping elements $e_2$, $e_6$, and $e_{11}$ to 1, $H_7(CRS)$ is obtained as follows:

$$H_7(CRS)=e_1e_3(e_41+e_5)(e_7(e_91+e_{10}e_{12})+e_8e_{13})$$
$$e_{14}E=e_1e_3(e_4+e_5)(e_7(e_9+e_{10}e_{12})+e_8e_{13})$$
$$e_{14}E=e_1e_3(e_7(e_9+e_{10}e_{12})+e_8e_{13})e_{14}E \text{(since } e_4+e_5=1 \text{ in } R)$$

Mapping $H_7(CRS)$ to execution behaviors results in the following $H_7(CRB)$:

$$B4(8(T)(9(T)+9(F)12)+8(F)15)17E$$

Perform Verification of Property Using $H_7(CRB)$

After computing $H_7(CRB)$, the method 300 proceeds to step 340 in which verification of the property using $H_7(CRB)$ is performed.

Verifying the Division by Zero Property Using $H_7(CRB)$ for Sample Code Set #1

Verifying the division by zero property using $H_7(CRB)$ for sample code set #1 involves checking the behaviors that result from $H_7(CRB)$.

The representation of homomorphic execution behaviors is:

$$B4(8(T)(9(T)+9(F)12)+8(F)15)17E$$

The terms are multiplied using distributivity to obtain individual behaviors. A first behavior that can result from the homomorphic behaviors is the following:

$$B48(T)9(T)17E$$

According to this first behavior for sample code set #1, line 2 (B or begin) is executed, line 4 is executed, condition 2 in line 8 is true, condition 3 in line 9 is true, line 17 is executed, and line 18 (E or end) is executed. A division by zero cannot occur at line 17 because d=a2, and is a positive integer.

A second behavior that can result from $H_7(CRB)$ is the following:

$$B48(T)9(F)1217E$$

According to this second behavior for sample code set #1, line 2 (B or begin) is executed, line 4 is executed, condition 2 in line 8 is true, condition 3 in line 9 is false, line 12 is executed, line 17 is executed, and line 18 (E or end) is executed. A division by zero is possible at line 17 because d=a2−a1=0.

A third behavior that can result from $H_7(CRB)$ is the following:

$$B48(F)1517E$$

According to this third behavior for sample code set #1, line 2 (B or begin) is executed, line 4 is executed, condition 2 is false, line 15 is executed, line 17 is executed, and line 18 (E or end) is executed. A division by zero is not possible at line 17 because d=a2+1, and is a positive integer.

Since a1 and a2 are positive integers, the second behavior gives the only homomorphic behavior for the division by zero. The second behavior implies that the condition in line 8 must be true, the condition in line 9 must be false, and the condition in line 5 could be true or false for the division by zero. The division by zero can be ascertained by checking whether 8=true and 9=false holds for some input.

Example: Lock Followed by Unlock

As another illustration of the compact representation EB, a second sample program called "sample code set #2" is provided in Table 6 below. Again, a line number precedes each line of code, but is for descriptive purposes only and is not part of the code.

TABLE 6

| | sample code set #2 |
|---|---|
| 1 (B) | int main(bool C1, bool C2, bool C3) { |
| 2 | int counter = 0; |
| 3 | while (C1) { |
| 4 | lock (0); |
| 5 | if (C2) { |
| 6 | break; |
| 7 | } else { |
| 8 | unlock (0); |
| 9 | } |
| 10 | if (C3) { |
| 11 | counter++; |
| 12 | } else { |
| 13 | continue; |
| 14 | } |
| 15 (E) | } |
| 16 | } |

Computing the Compact Representation CRS for Sample Code Set #2

In sample code set #2, a lock command should always be followed with an unlock command to avoid problematic behavior of the program. Conditions C1, C2, and C3 can change as the loop iterates. The goal of the analysis is to analyze all execution behaviors for various combinations of Boolean values for conditions C1, C2, and C3, identifying how many execution behaviors are produced by the program, how many of the execution behaviors produce the vulnerability, and what those behaviors are.

Irrespective of the number of iterations, a loop behavior is a sequence of basis behaviors. Base behaviors are for: a complete iteration, a partial iteration, or no iterations. In a loop, if the exit point is the same as the entry point, then it is a complete iteration; otherwise it is a partial iteration. In a structured program, a loop always has a unique entry point. If a loop has a BREAK or RETURN, then the last iteration can be a partial iteration. A successor element in a partial iteration repeats in the CRS. Program loops require an artifact to represent behaviors that can iterate any number of times. A break in a loop requires an artifact to represent behaviors that can terminate the loop in the middle of iterations. For sample code set #2, the following execution behaviors are for complete iterations:
Complete Execution behavior 1: C1(T) 4 C2(F) 8 C3(T) 11
Complete Execution behavior 2: C1(T) 4 C2(F) 8 C3(F) 13

The following execution behavior are for partial iterations resulting from the break statement:
Partial Execution behavior 3: C1(T) 4 C2(T) 6
The following execution behavior is for the normal exit from the loop:
Execution behavior 4: C1(F)
For the first (n−1) iterations, the execution behavior must be 1 or 2. This must be the case because, if the loop iterates n times, then the first (n−1) iterations must result in iterative behavior and the n$^{th}$ iteration must result in a break (execution behaviors) or exit from the loop (execution behaviors 4). Thus, estimating the number of execution behaviors for n iterations, the total number of possible behaviors is 2$^n$.

Using the compact representation CRB, the execution behaviors can be represented in the following manner:

CRB=B2(C1(T)4C2(F)8C3(11+13))*C1(4C2(T)6+1)E

In the preceding line, the terms (C1(T) 4 C2(F) 8 C3(11+13))* correspond to the iterative execution behaviors (C1(T) 4 C2(F) 8 C3(T) 11 and C1(T) 4 C2(F) 8 C3(F) 13). The terms C1(4 C2(T) 6 correspond to execution behaviors with a break (C1(T) 4 C2(T) 6). The multiplicative identity 1 corresponds to the execution behavior with no iteration (C1(F)).

Program statements or instructions are present at lines B, 2, 3, 4, 5, 6, 8, 10, 11, 13, and E.

Implementing method 310 to compute the compact representation EB for sample code set #2, at step 312 program statements are assigned variables as shown in Table 6.

TABLE 6 assignment of variables to program statements of sample code set #2

|     | 1 (B)  | int main(bool C1 bool C2, bool C3) { |
| --- | ------ | ------------------------------------ |
| X1  | 2      | int counter = 0;                     |
| X2  | 3      | while (C1) {                         |
| X3  | 4      | lock (0);                            |
| X4  | 5      | if (C2) {                            |
| X5  | 6      | break;                               |
|     | 7      | } else {                             |
| X6  | 8      | unlock (0);                          |
|     | 9      | }                                    |
| X8  | 10     | if (C3) {                            |
| X9  | 11     | counter++;                           |
|     | 12     | } else {                             |
| X10 | 13     | continue;                            |
|     | 14     | }                                    |
|     | 15 (E) | }                                    |
|     | 16     | }                                    |

As can be seen in Table 6, the program statement in line 2 (B or begin) is assigned the variable X1, the program statement in line 3 is assigned the variable X2, the program statement in line 4 is assigned the variable X3, and so on.

At step 314, the following set of linear equations are set up:

$X1 = e12 X2$ $X2 = (e10 X3 + e11 E)$ $X3 = e9 X4$ $X4 = (e2 X5 + e8 X6)$ $X5 = e1 E$ $X6 = e7 X7$ $X7 = (e3 X8 + e4 X9)$ $X8 = e6 X2$ $X9 = e5 X2$

At step 316, the system of linear equations set up at step 314 are solved by performing back substitution as follows:

$X6 = e7(e3\,X8 + e4\,X9) = e7(e3\,e6\,X2 + e4\,e5\,X2)$ $X3 =$ $e9\,X4 = e9(e2\,X5 + e8\,X6) = e9(e2\,e1\,E + e8\,e7(e3\,e6\,X2 + e4\,e5\,X2)$ $X2 = (e10\,e9\,(e2\,e1\,E + e8\,e7\,(e3\,e6\,X2 + e4\,e5\,X2) + e11\,E)$ $X2 = (e10\,e9\,e2\,e1\,E + e10\,\,e9\,e8\,e7\,(e3\,e6\,X2 + e4\,e5\,X2) + e11\,E)$ $X2 = e10\,e9\,e8\,e7(e3\,e6 + e4\,e5)\,X2) + (e10\,e9\,e2\,e1 + e11)\,E$ $(1 - e10\,e9\,e8\,e7\,(e3\,e6 + e4\,e5))\,X2 = (e10\,e9\,e2\,e1 + e11)\,E$ $X2 = \left(\frac{(e10\,e9\,e2\,e1 + e11)\,E}{1 - e10\,e9\,e8\,e7\,(e3\,e6 + e4\,e5)}\right)$ (Use the multiplicative inverse)

$X2 = (e10\,e9\,e8\,e7\,(e3\,e6 + e4\,e5)) * (e10\,e9\,e2\,e1 + e11)\,E$ $X1 = e12(e10\,e9\,e8\,e7(e3\,e6 + e4\,e5)) * (e10\,e9\,e2\,e1 + e11)\,E$

Thus, the CRS for sample code set #2 is:

$e12(e10e9e8e7(e3e6+e4e5))*(e10e9e2e1+e11)E$

The algebraic expression is mapped to behaviors. If $e_i=(n_1\,n_2)$, then $e_i$ maps to $n_1$.

$e1=(6E)$ $e2=(56)$ $e8=(58)$ $e3=(1011)$ $e4=(1013)$ $e5=(133)$ $e6=(113)$ $e7=(810)$ $e9=(45)$ $e10=(34)$ $e11=(eE)$ $e12=(23)$

Thus, the corresponding CRB for sample code set #2 is:

2(3(T)45(F)8(10(T)11+10(F)13))*(3(T)45(T)6+3(F))E

Identifying Relevant Program Statements for Sample Code Set #2

For sample code set #2, the program may fail if a lock command is not followed by an unlock command; therefore the property P to be verified is a lock not followed by unlock. The goal of verification is to verify whether the property holds; and produce the execution behaviors for which the property fails.

At step 320, the relevant program statements are identified. For sample code set #2, the relevant program statements are those that are related to lock and unlock. Program statements or instructions are present at lines B, 2, 3, 4, 5, 6, 8, 10, 11, 13, and E. Program statements that are relevant to LOCK-UNLOCK are present at lines B, 3, 4, 5, 8, 10, and E, and these lines are thus identified as the subset of relevant program statements. The complement T={2, 6, 11, 13}. The homomorphism defined with T is denoted by $H_T$.

Computing $H_T$(CRS) for Sample Code Set #2

For sample code set #2, the property to be verified is lock at line 4 not followed by unlock at line 8. Computing $H_T$(CRS) 330 involves defining a homomorphism $H_T$ that maps to 1 the statements that are not relevant to the lock not followed by unlock property. Program statements are present at lines 1, 2, 3, 4, 5, 6, 8, 10, 11, 13, and 15. As previously described with respect to step 320, relevant program statements are present at lines 1, 2, 3, 4, 5, 8, 10, and 15. The complement of the relevant program statements is {6, 11, 13}; thus lines 6, 11, and 13 contain the non-relevant program statements.

As previously described, the CRS for sample code set #2 is:

$$e12(e10 e9 e8 e7(e3 e6+e4 e5))*(e10 e9 e2 e1+e11)E$$

The successor relation can be expressed as:

$$e1=(6E)$$
$$e2=(56)$$
$$e8=(58)$$
$$e3=(1011)$$
$$e4=(1013)$$
$$e5=(133)$$
$$e6=(113)$$
$$e7=(810)$$
$$e9=(45)$$
$$e10=(34)$$
$$e11=(eE)$$
$$e12=(23)$$

Mapping elements e12, e1, e6 and e5 to 1 results in $H_T$(CRS) as follows:

$$H_T(CRS) = 1(e10\,e9\,e8\,e7(e3\,1 + e4\,1))*(e10\,e9\,e2\,1 + e11)E$$
$$= (e10\,e9\,e8\,e7(e3 + e4))*(e10\,e9\,e2 + e11)\,E$$
$$= (e10\,e9\,e8\,e7)*(e10\,e9\,e2 + e11)\,E \text{ (since } e3 + e4 = 1 \text{ in } R)$$

Mapping $H_T$(CRS) to execution behaviors results in the following $H_T$(CRB):

$$(3(T)45(F)8)*(3(T)45(T)+3(F))E$$

Verifying the Lock not Followed by Unlock Property Using $H_T$(CRB) for Sample Code Set #2

Verifying the lock not followed by unlock property using $H_T$(CRB) for sample code set #2 involves checking the behaviors that result from the homomorphic representation. By analyzing the homomorphic image, it is easy to verify that the lock not followed by unlock property holds during iterative behaviors, but fails for the following behaviors where there is a break command following some iterations.

$$H_T(CRB)=(3(T)45(F)8)*(3(T)45(T)+3(F))E$$

The term 3(T) 45(T) of $H_T$(CRB) correspond to vulnerable behavior. It shows that when the conditions in program statements 3 and 5 are true, 4 which is the lock statement is not followed by an unlock statement.

Computing Multi-Level Function Sequences for Complete Software Analysis

In real-world software the code is divided into many functions. The totality of execution behaviors resulting from calls to functions must be examined to verify safety or security properties.

Execution of a function results in a sequence of function calls called the function sequence. The sequences may include repetitive calls to a function that is called inside a loop. Let f be the function being analyzed/verified. A function call to a function g is said to be at level k, if the call to g involves nested function calls $f_0, f_1, f_2, f_k$ such that $f_i$ calls $f_{i+1}$ for i=0 to (k−1) with $f_0$=f and $f_k$=g. A direct call is a call at level 1.

Suppose we have the following: f, $f_1$, $f_2$, $f_3$ and $f_k$=g. Suppose a lock is followed by a call to $f_1$, and g=unlock. If only the direct calls are included, the execution behavior of f would show the function sequence: lock, $f_1$. However, this is an incomplete execution behavior. A complete execution behavior calls for capturing sequences of nested function calls at all levels.

FIG. 4 shows a method 400 for computing multi-level function sequences to account for the totality of execution behaviors that can cut across many functions. We will use the code example in Table 7 to illustrate the computation of multi-level function sequences.

TABLE 7

| | | sample code set #3 | |
|---|---|---|---|
| | | 1 (B) | f (bool C) { |
| X1 | | 2 | lock (0); |
| X2 | | 3 | $f_1$(C); |
| | | 4 (E) | } |
| | | 5 (B) | $f_1$ (bool C) { |
| X3 | | 6 | if(C) { |
| X4 | | 7 | $f_{11}$(0); |
| | | 8 (E) | } |
| | | 9 | } |
| | | 10 (B) | $f_{11}$ ( ) { |
| X5 | | 11 | unlock (0); |
| | | 12 (E) | } |

The call graph for the sample code set #3 is shown in FIG. 10. The call graph is computed at step 410 in FIG. 4. At step 412 the CRS is computed for functions f, $f_1$, and $f_{11}$. At step 414 the 1$^{st}$ level function sequences are computed.

1$^{st}$ level function sequences for f: lock, $f_1$
1$^{st}$ level function sequences for $f_1$: $f_{11}$+1
1$^{st}$ level function sequences for $f_{11}$: unlock By back-substituting sequences of f11 into f1 and then the sequences for f1 into f, we get:

Multi-level function sequences for f: lock, $f_1$[$f_{11}$[unlock]+1]

The square brackets as in f[$f_1$] denote f calls $f_1$. Above computation shows that f has two multi-level function sequences:

1. lock, $f_1$[$f_{11}$[unlock]—lock is followed by unlock
2. lock, $f_1$—vulnerability, lock is not followed by unlock Efficient Algorithms Enabled by Compact Representation Unlike truth tables which are exponential in size, the size of the CRS is less than twice the number of program statements. The representation enables efficient software analysis and verification algorithms that run in linear time with respect to the size of the CRS. For example, the number of execution behaviors can be counted in O(n) time where n is the number of program statements. The number of behaviors due to a loop are counted the number of behaviors for complete and partial iterations. The actual number of loop execution behaviors can actually be larger due to the multiplicity of iterations. Even with this conservative estimation, the number of execution behaviors is often very large even for a single function. For example, the function lustre_assert_wire has more than $6.4*10^{952}$ execution behaviors—many orders of magnitude larger than the number atoms in the universe, which is estimated to be between $10^{78}$ to $10^{82}$.

Enumerating all execution behaviors is an intractable problem, even for small programs. Counting the number of execution behaviors can be done in O(n) time using CRS. This is possible due to algebraic properties of CRS. For example, the CRS for the division-by-zero (DBZ) example was shown earlier and we noted that the number of distinct execution behaviors is 6. The count is derived by distributivity of multiplication over addition. The CRS for the DBZ:

$$e1e2e3(e4e6+e5)(e7(e9e11+e10e12)+e8e13)e14E$$

The number of behaviors is the number of terms after algebraic simplification. In this case, we have two terms in one parenthesis (separated by one +) and three terms in the second parenthesis (separated by two +s). Algebraic simplification involves multiplication which would yield six terms, hence six behaviors. Thus, we see that behaviors can be counted efficiently without enumerating each behavior.

Accuracy and Applicability to Large Software

High accuracy is achievable with the disclosed methods because the approach does not miss any execution behavior. The approach avoids errors caused by error-prone approximations used by current methods to cope with the large number of behaviors. The approach enables accurate reasoning of complex loops.

The disclosed algebraic approach is also efficient for application to large software with millions of lines of code because of the compact representation of behaviors the use of homomorphisms as a powerful proof technique. Empirical results studying the Linux kernel show that the approach is highly accurate, identifying bugs in the Linux kernel which were accepted by the Linux developers. The empirical study involved three versions of the Linux kernel with about 60 million lines of code in total. It involved more than 66,000 lock instances. For each instance, it was checked whether the lock is followed by unlock on all execution paths. Several instances involved computation of multi-level function sequences. The number of execution behaviors of some Linux functions is so large that the analysis would be intractable without the compact representations of behaviors.

Distinguish Between Structured Vs. Non-Structured Programs

The disclosed approach serves to distinguish between structured vs. unstructured programs. The CRS for a structured program has each successor element only once, whereas the CRS for an un-structured program has successor elements with repetitions. For example, the successor elements e2 and e3 are repeated in the CRS for the control flow graph of the unstructured program shown in FIG. 5; the repeated successor elements are highlighted and boxed.

In a structured program, a loop (or any control body) has one entry and one exit. A loop can have additional exits due to BREAK statement and it can have additional exits due to Go To statements. In FIG. 5, the program is unstructured because the loop has more than one exit. In FIG. 6, the program is unstructured because the loop has more than one entry.

In FIG. 5 the control flow graph for a non-structured program and the CRS for it. The loop body is (A2A3A4A5). The loop is represented by (e2e3e4e5)* in CRS. The loop has two exits A2 and A4. A2 is the normal entry and the normal exit of the loop. The other exit A4 is referred to as a BREAK in programming languages.

The unnecessary repetitions are removed from the CRS by algebraic factorization. However, the CRS of an unstructured program has a minimal set of repetitions which cannot be removed by factorization. The repetitions of e2 and e3 shown in FIG. 5 cannot be removed by factorization.

The repetitions of successors elements distinguish all kinds of unstructured programs. FIG. 6 shows the control flow graph for another unstructured program and the CRS for it. The successor elements e4 and e5 are repeated in the CRS.

In FIG. 6 the control flow graph for a non-structured program and the CRS for it. The loop body is (A2A3A4). The loop is represented by (e3e4e5)* in CRS. The loop has two entries A2 and A3. A2 is the normal entry and the normal exit of the loop. The other entry A3 is associated with a Go To statement in programming languages. The repetitions of e3 and e4 shown in FIG. 6 cannot be removed by factorization.

Transform Unstructured Control Graph to Structured Control Graph

The repetitions in CRS dictate a canonical transform from the unstructured graph to structured graph. The canonical transform preserves program behaviors. FIG. 7 shows the graph transform for the unstructured graph shown in FIG. 5.

To describe the transform, we introduce the notions: colored graph and equivalent edges.

Colored Graph: Treat the node label as the color of the node. AqR denotes the same color as Aq. In FIG. 5, the pairs of nodes with the same color are (A3, A3R) and (A4, A4R).

Equivalent Successor Elements: Successor elements are equivalent if their heads have the same color and also the tails have the same color. In FIG. 7, (e2, e2R) and (e3, e3R) are pairs of equivalent edges.

Using the above definitions, the graph transformation steps are:

1. Transform the CRS by replicating the repeated successors with equivalent successors—the replicated successors are marked as e2R and e3R. The transformed CRS is shown in FIG. 7.
2. Construct the graph corresponding to the transformed CRS. Note that there is a unique graph given a CRS. The transformed graph is shown in FIG. 7. Note that the additional exit from the loop is removed.

FIG. 8 shows the graph transform for the unstructured graph shown in FIG. 6.

The CRS of an unstructured code has repetitions of successor elements which correspond exactly to the code that has to repeated to produce an equivalent structured code. The unstructured and the structured codes have the same CRS except instead of repeated successor elements in the CRS for the unstructured code are replaced by the corresponding successor elements from the duplicated code. Thus, the equivalence of behaviors is evident in the CRS.

Inducing Program Transform from Graph Transform

The transform from unstructured to structured graph can be induce a corresponding transform from unstructured to structured program.

FIG. 9 shows the complete transformation process: (1) transform the program to the control flow graph G1, (2) perform the transform from unstructured graph G1 to structured graph G2 (illustrated in FIGS. 7 and 8), (3) transform structured graph G2 to the corresponding structured program.

The colored graph has two kinds of nodes differentiated in FIG. 9 using two different shapes. The circle nodes have the out degree one. The diamond nodes have the out degree greater than one. The diamond node A4 became the circle node A4 in the transformed graph. We skip the detail of the circle node A4 in G2 and why it is retained, the important point to note is the condition part of A4 (denoted by A4C) is merged with the A2 in G2. The merging is reflected by the fact that A2 in G2 has out degree 3 whereas A2 in G1 has out degree 2.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer implemented method for analyzing and verifying a software program for safety and security comprising:
providing a software program, wherein the software program comprises a sequence of program statements to be executed by a processor of a computing device;
computing a compact representation of the software program; wherein computing a compact representation of the software program comprises:
assigning a variable to each program statement;
setting up a system of linear equations;
solving the system of linear equations to obtain a solution; and
translating the solution to statement identifications to obtain the compact representation;
identifying a subset of program statements that are relevant to a property of the software program to be verified;
computing a homomorphism that maps program statements that are not relevant to the property to be verified to an identity; and
verifying the property using the homomorphism.

2. The method of claim 1 wherein setting up a system of linear equations comprises setting up an equation $X_p = e_i X_q$ wherein p comprises a program statement and the program statement p has a unique successor program statement q, wherein $X_p$ comprises the variable assigned to program statement p and $X_q$ comprises the variable assigned to program statements q, and $e_i$ is a successor element (p q).

3. The method of claim 2 wherein setting up a system of linear equations further comprises setting up an equation $X_p = e_i X_q + e_j X_r$ wherein program statement p has successor program statements q and r, wherein $X_P$ comprises the variable assigned to program statement p, $X_q$, comprises the variable assigned to program statement q, $X_r$ comprises the variable assigned to program statements r, $e_i$ comprises a successor element (p q), and $e_j$ comprises a successor element (p r).

4. The method of claim 1 wherein solving the system of linear equations to obtain a solution comprises solving the system of linear equations over the successor elements using back substitutions.

5. The method of claim 4 wherein an equation having a form a X=b is solved as X=a*b using a division operation.

6. The method of claim 1 wherein the solution to the system of linear equations is denoted $X_a$ and wherein $X_a$ is interpreted as a set of execution behaviors starting at a program statement a.

7. The method of claim 6 wherein a compact representation with successor elements comprises the solution for $X_0$.

8. The method of claim 7 further comprising mapping the compact representation with successor elements to execution behaviors of the program by mapping each successor element (p q) to a program statement p to obtain a compact representation of behaviors.

9. The method of claim 8 wherein, for a program statement p with successor q when a condition in p is TRUE and a successor r when a condition in p is FALSE, a successor element (p q) is mapped to p(T) and a successor element (p r) is mapped to p(F).

10. The method of claim 9 wherein computing a homomorphism that maps program statements that are not relevant to the property to be verified to an identity comprises providing a control statement p wherein all statements under p(T) and all statements under p(F) are mapped to a multiplicative identity, and mapping the control statement p to the multiplicative identity.

11. The method of claim 10 further comprising algebraically reducing the compact representation of behaviors by applying the homomorphism $H_T$ to obtain a reduced compact representation of behaviors denoted by $H_T(CRB)$.

12. The method of claim 11 wherein $H_T(CRB)$ is used to verify the property to be verified.

13. The method of claim 11 wherein first level function sequences are computed using $H_T(CRB)$ where T comprises set of program statements that include function calls.

14. The method of claim 13 wherein multi-level function sequences are computed by back substitutions of first level function sequences.

15. The method of claim 14 further comprising analyzing execution behaviors that cut across multiple functions using the computed function sequences.

16. The method of claim 8 further comprising identifying repetitions of successor elements in the compact representation with successor elements to identify one or more non-structured parts of the program.

17. The method of claim 16 further comprising transforming a non-structured program graph into a structured program graph by duplicating the repeated successor elements and nodes corresponding to the repeated successor elements.

18. The method of claim 17 further comprising transforming non-structured parts of the program into structured program using the structured program graph.

19. A computer implemented method for analyzing and verifying a software program for safety and security comprising:
providing a software program, wherein the software program comprises a sequence of program statements to be executed by a processor of a computing device;
computing a compact representation of the software program; wherein computing a compact representation of the software program comprises:
assigning a variable to each program statement;
computing a successor relation for each program statement;

enumerating one or elements in each successor relation imposing a non-commutative ring structure on the enumerated successor relation elements, wherein the ring structure comprises one or more properties selected from the group consisting of addition, multiplication, additive identity denoted by 0, multiplicative identity denoted by 1, and multiplicative inverse;

setting up a system of linear equations;

solving the system of linear equations to obtain a solution; and translating the solution to statement identifications to obtain the compact representation.

20. The method of claim 19 wherein computing a compact representation of the software program further comprises:

identifying a subset of program statements that are relevant to a property of the software program to be verified;

computing a homomorphism that maps program statements that are not relevant to the property to be verified to an identity; and verifying the property using the homomorphism.

\* \* \* \* \*